United States Patent
Wright

(10) Patent No.: US 12,249,817 B2
(45) Date of Patent: Mar. 11, 2025

(54) TELECOMMUNICATION CABLE STRAIN RELIEF ASSEMBLIES

(71) Applicant: CORNING RESEARCH & DEVELOPMENT CORPORATION, Corning, NY (US)

(72) Inventor: Jameson Rensloe Wright, Austin, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 72 days.

(21) Appl. No.: 17/989,053

(22) Filed: Nov. 17, 2022

(65) Prior Publication Data

US 2023/0170682 A1 Jun. 1, 2023

Related U.S. Application Data

(60) Provisional application No. 63/284,093, filed on Nov. 30, 2021.

(51) Int. Cl.
*H02G 15/007* (2006.01)
*H02G 3/08* (2006.01)

(52) U.S. Cl.
CPC ........... *H02G 15/007* (2013.01); *H02G 3/083* (2013.01)

(58) Field of Classification Search
CPC .. H02G 15/00–007; H02G 3/083; H02G 3/22; H02G 3/32; F16G 11/00–048
See application file for complete search history.

(56) References Cited

U.S. PATENT DOCUMENTS

| | | | |
|---|---|---|---|
| 6,025,561 A | 2/2000 | Dams | |
| 6,026,548 A | 2/2000 | Jackson | |
| 6,116,614 A * | 9/2000 | Wambeke | H02G 15/013 |
| | | | 277/633 |
| 7,001,081 B2 | 2/2006 | Cox et al. | |
| 7,603,020 B1 | 10/2009 | Wakileh et al. | |
| 7,806,374 B1 | 10/2010 | Ehmann et al. | |
| 7,869,681 B2 | 1/2011 | Battey et al. | |

(Continued)

FOREIGN PATENT DOCUMENTS

| | | |
|---|---|---|
| AU | 2013248256 A1 | 5/2014 |
| BR | 112013027953 A2 | 1/2017 |

(Continued)

OTHER PUBLICATIONS

European Patent Application No. 22210141.2, Extended European Search Report dated Apr. 6, 2023; 15 pages; European Patent Office.

*Primary Examiner* — Kareen K Thomas
(74) *Attorney, Agent, or Firm* — Tamika A. Crawl-Bey

(57) ABSTRACT

A strain relief assembly includes a top plate and a bottom plate. The top plate defines a plurality of top ports configured to receive a plurality of cables at a first point. The bottom plate defines a plurality of bottom ports configured to receive the plurality of cables at a second point. The strain relief assembly is movable between an open position and a closed position. In the open position, the plurality of top ports and the plurality of bottom ports collectively define a first passage area. In the closed position, the plurality of top ports and the plurality of bottom ports collectively define a second passage area smaller than the first passage area.

18 Claims, 12 Drawing Sheets

(56) References Cited

U.S. PATENT DOCUMENTS

| | | |
|---|---|---|
| 8,707,515 B2 | 4/2014 | Payne et al. |
| 8,727,319 B2 | 5/2014 | Hammons |
| 8,772,641 B2 | 7/2014 | Badura et al. |
| 8,774,585 B2 | 7/2014 | Kowalczyk et al. |
| 8,903,216 B2 | 12/2014 | Thompson et al. |
| 8,965,168 B2 | 2/2015 | Cowen et al. |
| 9,983,377 B2 | 5/2018 | Dellinger et al. |
| 10,061,091 B2 | 8/2018 | Kempeneers et al. |
| 10,268,010 B2 | 4/2019 | Pasek et al. |
| 10,622,795 B2 * | 4/2020 | Karlsson ............... A62C 3/16 |
| 10,790,655 B2 | 9/2020 | Nakai et al. |
| 10,830,967 B2 | 11/2020 | Pimentel et al. |
| 2007/0261880 A1 * | 11/2007 | Cox ..................... H02G 3/081 |
| | | 174/138 F |
| 2008/0210829 A1 | 9/2008 | Hetzer et al. |
| 2009/0034227 A1 * | 2/2009 | Mayer ................. H02G 15/007 |
| | | 361/826 |
| 2009/0242230 A1 * | 10/2009 | Hebert .................... H02G 3/14 |
| | | 174/67 |
| 2011/0154619 A1 | 6/2011 | Ward et al. |
| 2011/0268412 A1 | 11/2011 | Giraud et al. |
| 2012/0142212 A1 * | 6/2012 | Lyons, Jr. .......... H01R 13/5804 |
| | | 439/451 |
| 2012/0230646 A1 * | 9/2012 | Thompson ........... G02B 6/4477 |
| | | 385/136 |
| 2013/0058616 A1 | 3/2013 | Cote et al. |
| 2013/0233612 A1 * | 9/2013 | Pimentel .................. H02G 3/04 |
| | | 174/545 |
| 2013/0233615 A1 * | 9/2013 | Pimentel ............. G02B 6/4477 |
| | | 174/650 |
| 2013/0287360 A1 | 10/2013 | Beamon et al. |
| 2014/0119705 A1 | 5/2014 | Fabrykowski et al. |
| 2016/0091682 A1 * | 3/2016 | Wakileh ............... G02B 6/4455 |
| | | 439/529 |
| 2017/0329096 A1 | 11/2017 | Allen |

FOREIGN PATENT DOCUMENTS

| | | |
|---|---|---|
| CA | 2226407 C | 2/2007 |
| CN | 104508930 B | 5/2017 |
| CN | 103930813 B | 10/2017 |
| DE | 102007009223 B4 | 3/2011 |
| EP | 1656720 A1 | 5/2006 |
| EP | 2567279 B1 | 10/2014 |
| FR | 2740663 A1 | 5/1997 |
| GB | 0162174 A | 4/1921 |
| GB | 2476655 A | 7/2011 |
| WO | 2021/045909 A1 | 3/2021 |

* cited by examiner

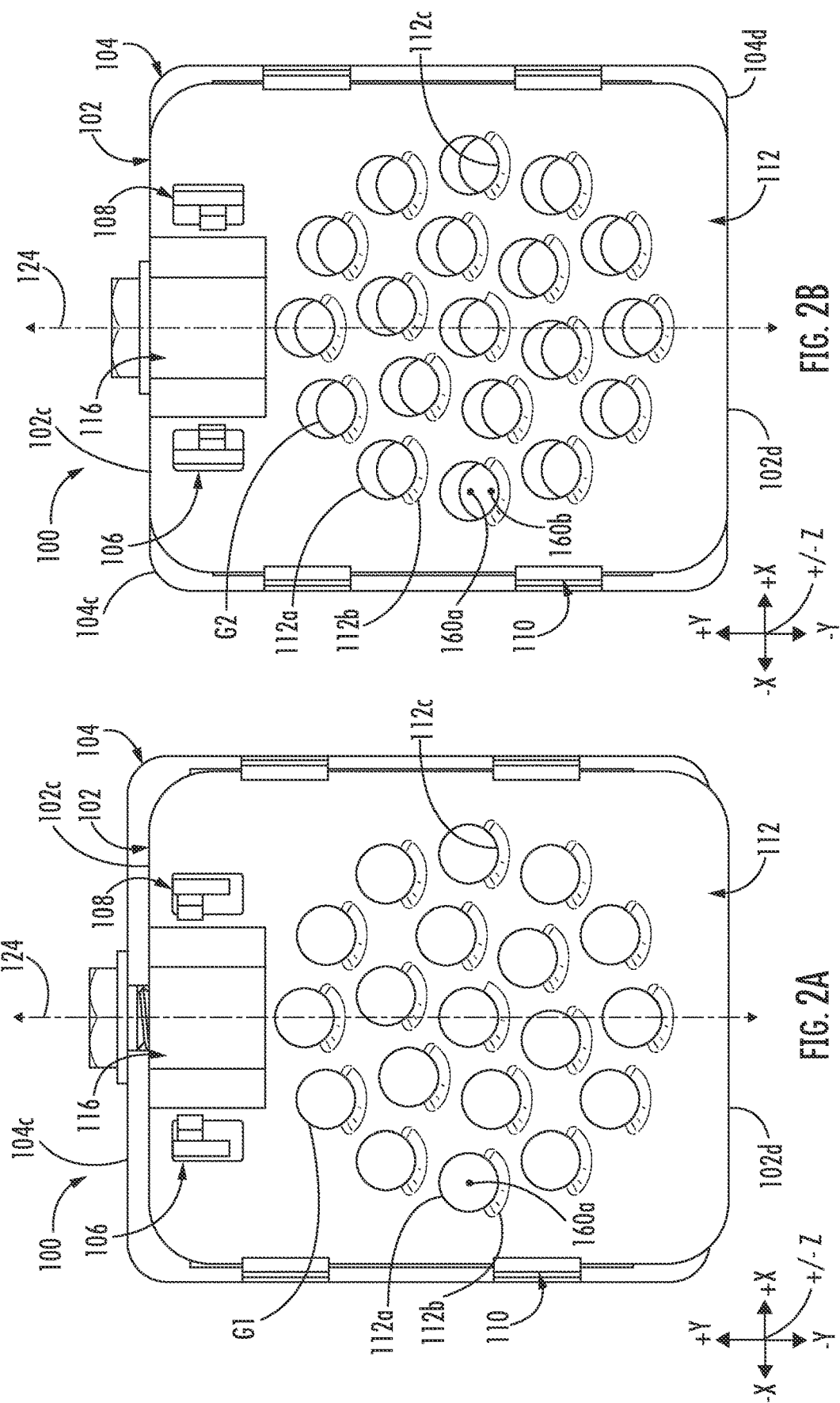

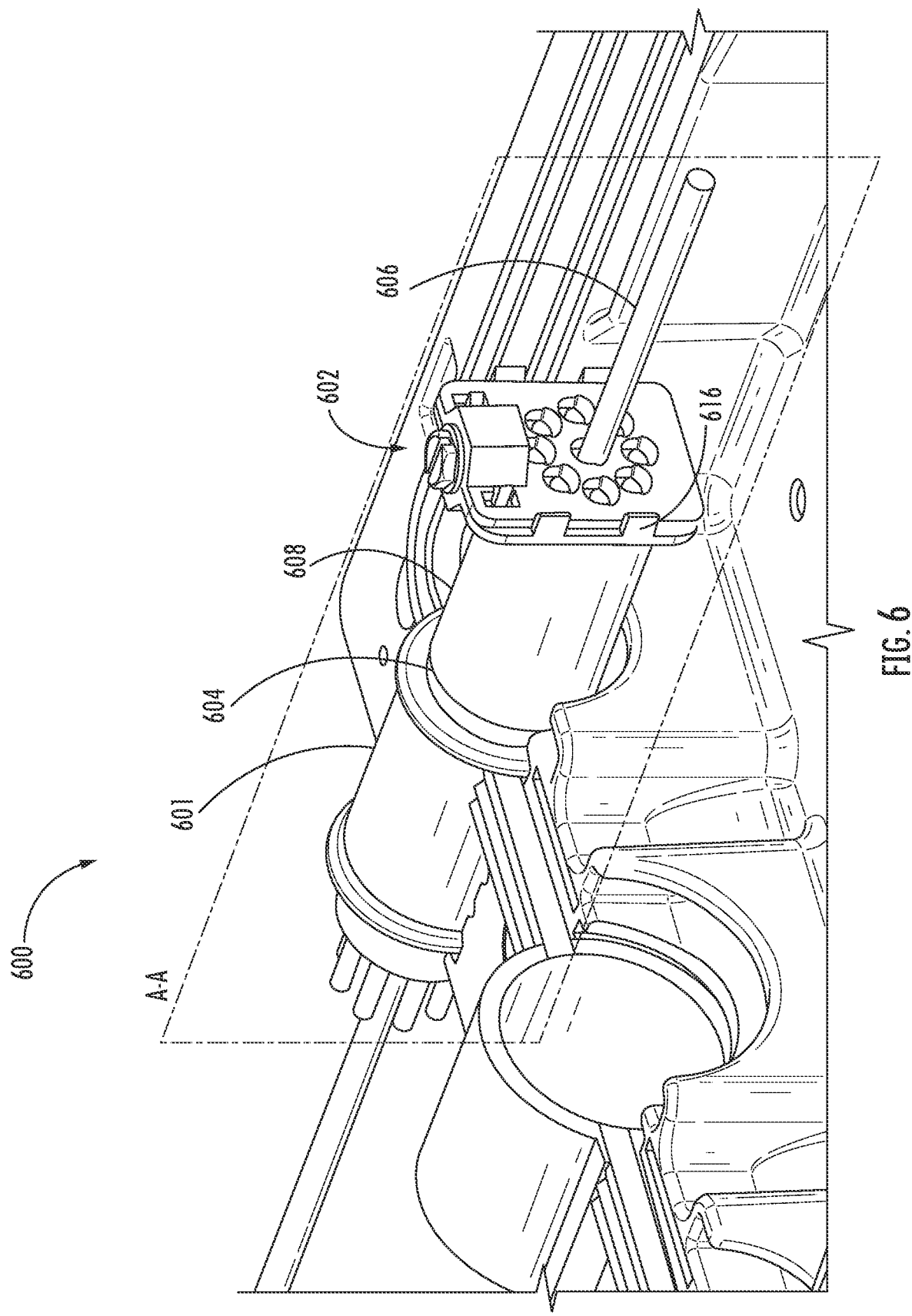

TELECOMMUNICATION CABLE STRAIN RELIEF ASSEMBLIES

CROSS-REFERENCE TO RELATED APPLICATION

The present application claims priority to U.S. Provisional Application No. 63/284,093, filed Nov. 30, 2021, the entirety of which is incorporated herein by reference.

BACKGROUND

The present specification generally relates to telecommunication cables and, more specifically, to strain relief assemblies for telecommunication cables.

Telecommunication cables enable telecommunication between a first terminal to a second terminal (or junction) by extending along a distance between the first terminal and the second terminal. The telecommunication cables may be subject to external forces, which may interrupt signal transmission. These forces may include pulling forces, pushing forces, cable tension, cable strain, and other environmental factors. Accordingly, it may be desirable to provide cables with securing mechanisms to absorb some of the forces to maintain communication.

Conventional approaches for securing telecommunication cables requires individually securing each cable entering a junction. Unfortunately, these approaches may be time-intensive and costly where there are a plurality of cables to be secured. In particular, in such conditions, each cable requires its own securing means, which results in additional costs and complexity.

Accordingly, a need exists for alternative telecommunication cable strain relief assemblies that are easier to assemble, more convenient and cost effective to use, and provide improved resilience.

SUMMARY

Additional features and advantages of the present disclosure will be set forth in the detailed description, which follows, and in part will be apparent to those skilled in the art from that description or recognized by practicing the embodiments described herein, including the detailed description, which is followed by the claims, as well as the appended drawings.

In a first aspect A1, a strain relief assembly including a top plate and a bottom plate. The top plate defines a plurality of top ports configured to receive a plurality of cables at a first point. The bottom plate defines a plurality of bottom ports configured to receive the plurality of cables at a second point. The strain relief assembly is movable between an open position and a closed position. In the open position, the plurality of top ports and the plurality of bottom ports collectively define a first passage area. In the closed position, the plurality of top ports and the plurality of bottom ports collectively define a second passage area smaller than the first passage area.

In a second aspect A2 according to the first aspect A1, the bottom plate includes a retaining device configured to retain the top plate to the bottom plate in the open position. In a third aspect A3 according to any of the preceding aspects A1-A2, the retaining device is extruded material. In a fourth aspect A4 according to any of the preceding aspects A1-A3, the plurality of top ports are coaxial to the plurality of bottom ports in the open position. In a fifth aspect A5 according to any of the preceding aspects A1-A4, each of the plurality of top ports includes a sharp edge configured to engage a respective cable of the plurality of cables. In a sixth aspect A6 according to any of the preceding aspects A1-A5, each of the plurality of bottom ports includes a sharp edge configured to engage a respective cable of the plurality of cables. In a seventh aspect A7 according to any of the preceding aspects A1-A6, further includes a fastener configured to move the strain relief assembly from the open position to the closed position in response to the fastener being fastened. In an eight aspect A8 according to any of the preceding aspects A1-A7, the fastener defines a longitudinal axis, and the strain relief assembly moves from the open position to the closed position in response to the top plate translating along the longitudinal axis. In a ninth aspect A9 according to any of the preceding aspects A1-A8, each of the plurality of top ports are configured to apply a shear force on the plurality of cables at the first point in the closed position. In a tenth aspect A10 according to any of the preceding aspects A1-A9, each of the plurality of bottom ports are configured to apply a shear force on the plurality of cables at the second point in the closed position.

In an eleventh aspect A11, a strain relief assembly for a plurality of cables includes a bottom plate having an overlap edge and defining a plurality of bottom ports and a top plate defining a plurality of top ports. The top plate is movable between an open position and a closed position. In the open position, the top plate is retained to the bottom plate via the extruding member. In the closed position the top plate is immovably coupled to the bottom plate.

In a twelfth aspect A12, according to the eleventh aspect A11, the extruding member is extruded material. In a thirteenth aspect A13, according to any of proceeding aspects A11-A12, the plurality of top ports are coaxial to the plurality of bottom ports in the open position. In a fourteenth aspect A14, according to any of proceeding aspects A11-A13, each of the plurality of top ports include a sharp edge configured to engage a respective cable of the plurality of cables. In a fifteenth aspect A15, according to any of proceeding aspects A11-A14, each of the plurality of bottom ports include a sharp edge configured to engage a respective cable of the plurality of cables. In a sixteenth aspect A16, according to any of proceeding aspects A11-A15, each of the plurality of top ports are configured to apply a shear force on the plurality of cables in the closed position. In a seventeenth aspect A17, according to any of proceeding aspects A11-A16, each of the plurality of bottom ports are configured to apply a shear force on a respective cable the plurality of cables in the closed position.

In an eighteen aspect A18, a cable enclosure system includes a strain relief assembly, a grommet, an enclosure, and a collar. The strain relief assembly is movable between an open position and a closed position. In the open position, a plurality of top ports are defined in a top plate of the strain relief assembly and a plurality of bottom ports are defined in a bottom plate of the strain relief assembly collectively defining a first passage area. In the closed position, the plurality of top ports and the plurality of bottom ports collectively define a second passage area smaller than the first passage area. The grommet is positioned in the enclosure and the grommet is coupled to the strain relief assembly. The collar is positioned in an inlet of the enclosure, the collar being coupled to the grommet.

In a nineteenth aspect A19, according to the eighteen aspect A18, a plurality of cables extend through the grommet. The plurality of cables are secured to the strain relief assembly via the plurality of top ports and the plurality of bottoms ports in the closed position of the strain relief assembly. In a twentieth aspect A20, according to the eighteen aspect A18 or the nineteenth aspect A19, a strain relief clamp is positioned in the enclosure and a hose clamp disposed in the enclosure, the hose clamp coupling the strain relief clamp to the grommet.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2A, schematically depicts a top view the strain relief assembly of FIG. 1A in the open position, according to one or more embodiments shown and described herein;

FIG. 2B schematically depicts the strain relief assembly of FIG. 1A in the closed position, according to one or more embodiments shown and described herein;

FIG. 6 generally depicts a perspective view of a strain relief assembly assembled within an enclosure, according to one or more embodiments shown and described herein;

DETAILED DESCRIPTION

Figure 1A:
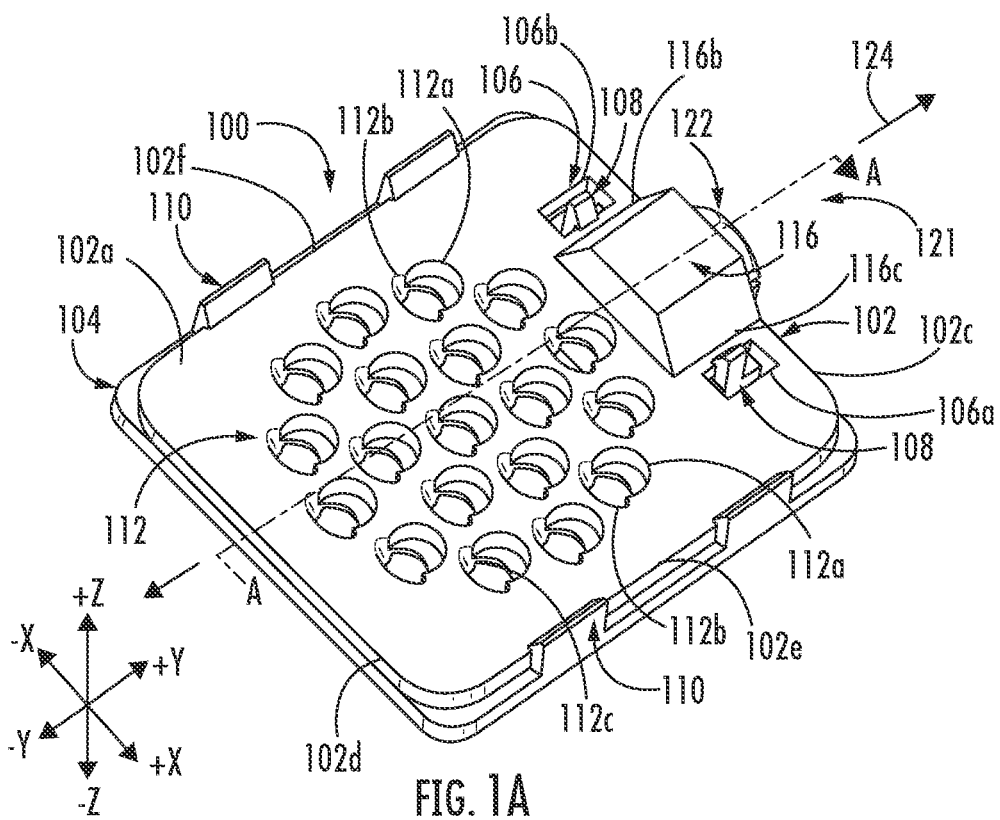
FIG. 1A schematically depicts a top view of a strain relief assembly in a closed position, according to one or more embodiments shown and described herein.

Referring generally to the figures, various embodiments of the strain relief assembly are generally depicted. The strain relief assembly may generally include a top plate and a bottom plate. The top plate includes a plurality of top ports configured to receive a plurality of cables at a first point. The bottom plate includes a plurality of bottom ports configured to receive the plurality of cables at a second point. The strain relief assembly is movable between an open position and a closed position. In the open position, the plurality of top ports and the plurality of bottom ports define a first area. In the closed position, the plurality of top ports and the plurality of bottom ports define a second area smaller than the first area. Accordingly, in the closed position, the strain relief assembly may clamp onto a cable received therein. Axial strain acting on the cable may be absorbed by the strain relief assembly, thereby providing improved performance. Strain relief assemblies according to the present disclosure provide improved ease of assembly, convenience, resilience and cost-effectiveness. These and additional embodiments and features will be described in greater detail below.

Referring now to FIGS. 1A-1F a strain relief assembly 100 is generally depicted. As used herein, the strain relief assembly 100 may also be referred to as a securing means, cable connector, or the like, which may be used to secure cables, such as telecommunication cables, while providing strain relief for the cables. The strain relief assembly 100 may generally include a top plate 102, a bottom plate 104, a retaining nut 120, and a fastening means 122, though a greater or fewer number of components are contemplated and possible. In embodiments, a portion of the top plate 102, a portion of the bottom plate 104, the retaining nut 120, and the fastening means 122 may define an adjustment assembly 121. The strain relief assembly 100 may also define a longitudinal axis 124 that extends parallel to the Y-axis of the depicted coordinate axes. In embodiments, a center line of the fastening means 122 extends coaxially along the longitudinal axis 124. It should be appreciated, however, that directional indicators (e.g., top, bottom, front, back, etc.) are not intended to limit the scope of the present disclosure, but rather are used for the convenience to describe positioning of components relative to the depicted coordinate axes.

The top plate 102 may be generally symmetrical across the longitudinal axis 124. As best illustrated in FIGS. 1C and 1D, the top plate 102 includes a first top surface 102a and a second top surface 102b opposite the first top surface 102a that are depicted as being substantially parallel to the X-Y plane of the depicted coordinate axes. In embodiments, the top plate 102 may be generally rectangular, though other shapes (e.g., hexagonal, octagonal, etc.) are contemplated and possible. The top plate 102 may be composed of plastic, metal, composites, or any other suitable material. In various embodiments, the top plate 102 may be manufactured via forming, injection molding, machining, casting, 3D printing, or the like. Referring again to FIG. 1A, the top plate 102 may further define a first edge 102c, a second edge 102d that opposite the first edge 102c, a third edge 102e, and a fourth edge 102f that opposite the third edge 102e. Accordingly, in embodiments, the top plate 102 may be generally rectangular, though other shapes are contemplated and possible (e.g., round, oval, or any other polygonal or non-polygonal shape).

Still referring to FIG. 1A, the top plate 102 may define a plurality of receiving apertures 106. The plurality of receiving apertures 106 may be generally rectangular, though other shapes (e.g., circular, hexagonal) are contemplated and possible. The plurality of receiving apertures 106 extend through a depth of the top plate 102 (e.g., the plurality of receiving apertures 106 are through-holes) in the +/−Z direction of the depicted coordinate axes. The plurality of receiving apertures 106 are positioned within a perimeter of the top plate 102. As depicted, the plurality of receiving apertures 106 are positioned between the first edge 102c, the second edge 102d, the third edge 102e, and the fourth edge 102f. For example, the plurality of receiving apertures 106 may be positioned proximate the first edge 102c. However, it is contemplated that the receiving apertures 106 may be positioned anywhere within the top plate 102. As will be described in greater detail herein, the plurality of receiving apertures 106 may be arranged to receive a plurality of internal mating features 108 of the bottom plate 104.

The top plate 102 defines a plurality of top ports 112 (e.g., apertures, through-holes). The plurality of top ports 112 extend through a depth of the top plate 102 in the +/−Z direction of the depicted coordinate axes. Each of the top ports 112 are sized and configured to receive a cable. In particular, the top ports 112 may be sized to receive any desired size cable depending on the particular application. In embodiments, each of the plurality of top ports 112 may define a perimeter which includes a top base portion 112a. In embodiments, at least a portion of the perimeter may include a top sloped surface 112b opposite the top base portion 112a that slopes to a top sharpened edge 112c, as best depicted in FIGS. 1C and 1D. For example, 10% or more of the perimeter may be sloped, 20% or more of the perimeter may be sloped, 30% or more of the perimeter may be sloped, etc. In embodiments, the top sloped surface 112b may be directed towards the first top surface 102a, as depicted. In other embodiments, the top sloped surface 112b may face away or in a different direction relative to the first top surface 102a. In some embodiments, the top sloped surface 112b may slope relative to the Y/Z plane between 10 degrees and 80 degrees, such as between about 30 degrees and about 60 degrees, such as about 45 degrees. The plurality of top ports 112 may be generally circular, although other shapes (e.g., rectangular, pentagonal, hexagonal, octagonal, etc.) are contemplated and possible. In embodiments, the sharpened edge 112c of the top sloped surface 112b may "bite" (e.g., engages) into a cable inserted into the top base portion 112a when the strain relief assembly 100 is moved to the closed position. Accordingly, a shear force may be applied upon each cable by the plurality of top ports 112. As will be described in greater detail herein, this shear force secures the cable to the strain relief assembly 100.

The top plate 102 may further define a first portion of the adjustment assembly 121. For example, the top plate 102 may include a top protrusion 116 which provides a first portion of the adjustment assembly 121. The top protrusion 116 may protrude from the first top surface 102a in the +Z direction of the depicted coordinate axes, and may define a hollow top portion 116a of a cavity 119, as best depicted in FIGS. 1C and 1D, configured to receive the retaining nut 120 as will be described in greater detail herein to adjust the strain relief assembly 100, via interaction with the fastening means 122. In the depicted embodiment, the top protrusion 116 defines a portion of a hexagonal shape, however, other shapes (e.g., round, rectangular, octagonal) are considered and possible. Referring again to FIG. 1A, the top protrusion 116 may be arranged laterally between two of the plurality of receiving apertures 106 in the +/−X direction of the depicted coordinate axes. For example, a first receiving aperture 106a may be positioned to a first side 116b of the top protrusion and a second receiving aperture 106b may be positioned on a second side 116c of the first protrusion so as to be positioned opposite the second receiving aperture 106b across the longitudinal axis 124, though other configurations are contemplated and possible. It is noted that by placing the receiving apertures 106a, 106b on either side of the adjustment assembly 121, retaining forces provided at the receiving apertures 106a, 106b may better retain the position of the top plate 102 and the bottom plate 104 relative to one another (e.g., in the +/−Z direction of the depicted coordinate axes) during longitudinal adjustment (e.g., adjustment in the +/−Y direction of the depicted coordinate axes) as will be described in greater detail herein.

Figure 1B:
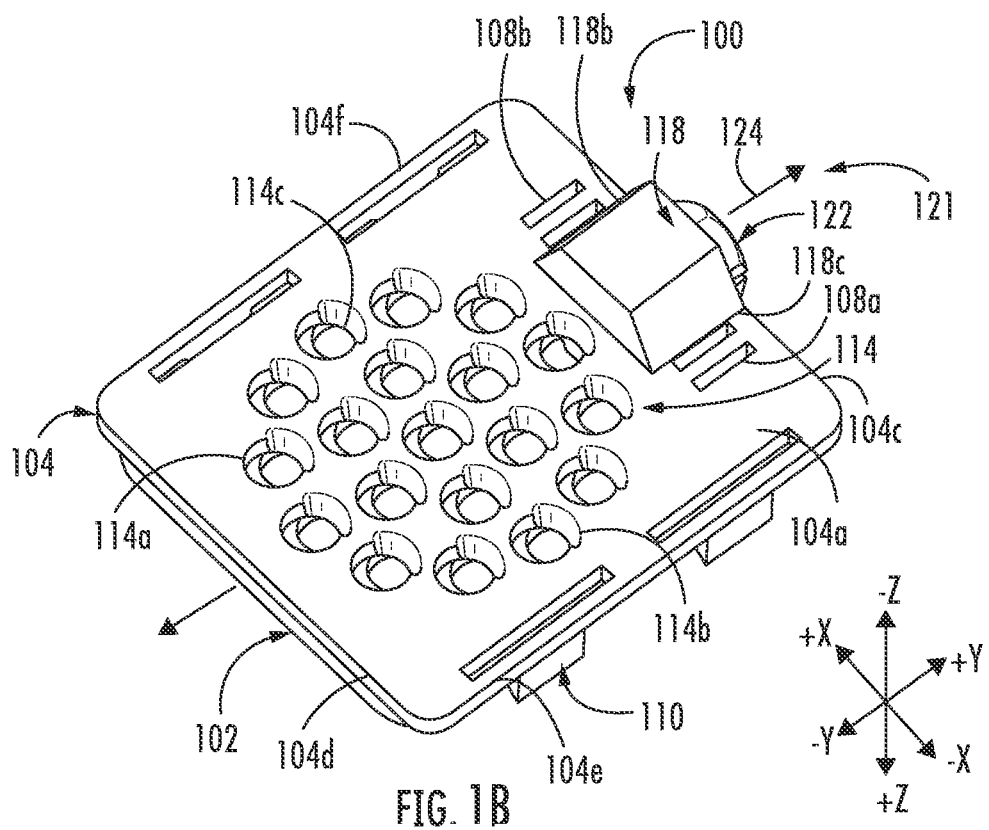
FIG. 1B schematically depicts a bottom view of the strain relief assembly of FIG. 1A in the closed position, according to one or more embodiments shown and described herein.
Figure 1C:
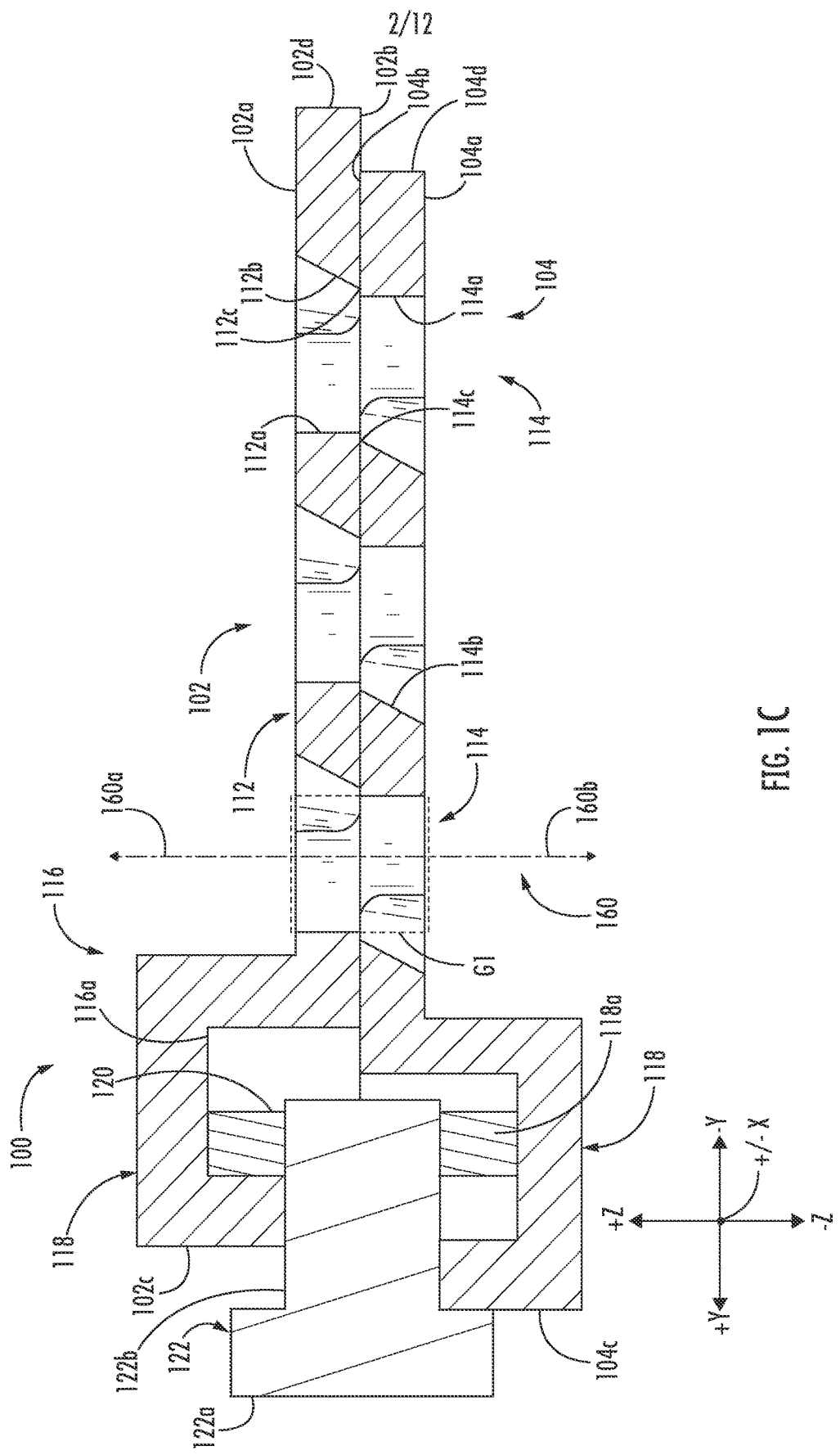
FIG. 1C schematically depicts a cross-sectional view of the strain relief assembly of FIG. 1A in an open position, taken along cross-section A-A in FIG. 1A.
Figure 1D:
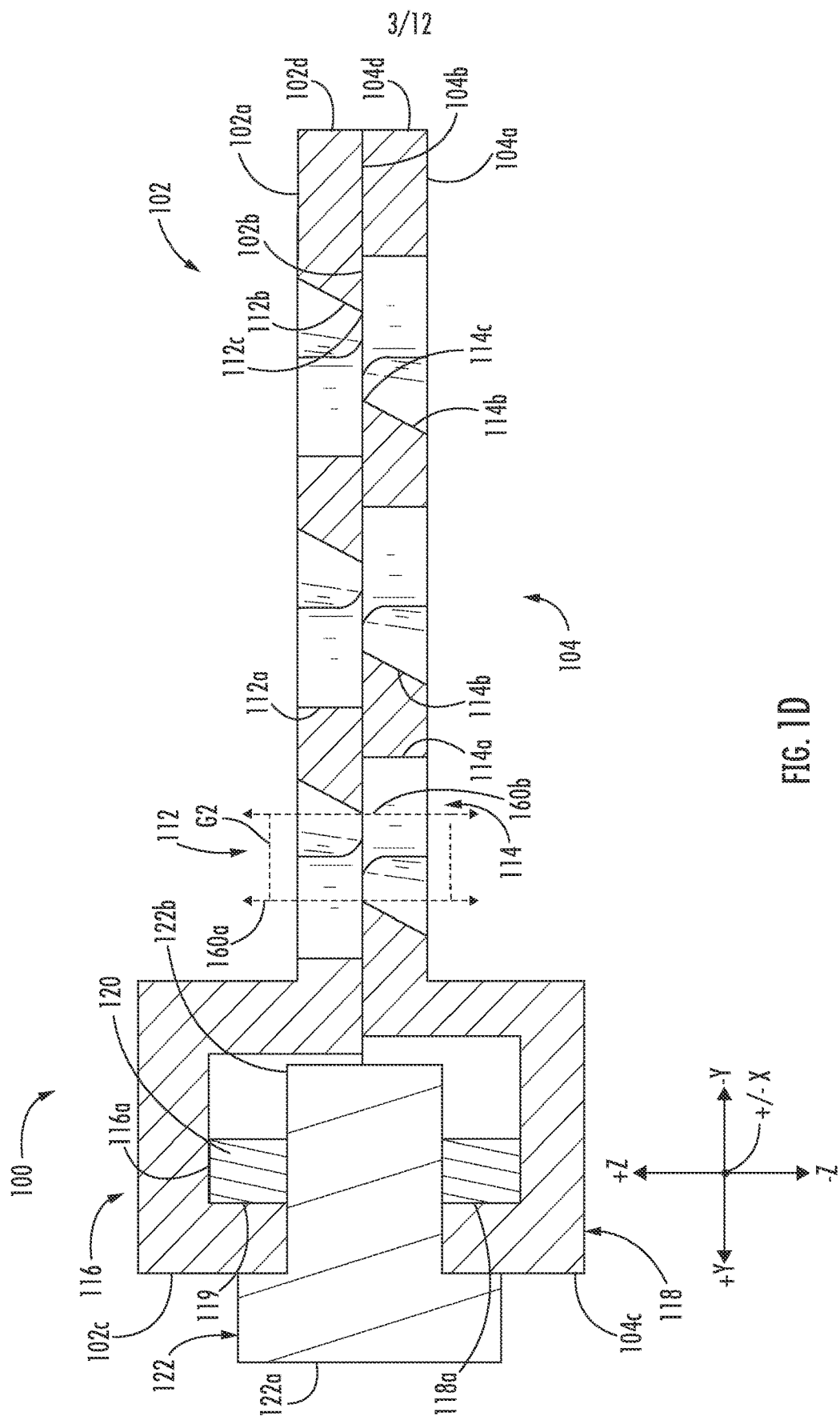
FIG. 1D schematically depicts a cross-sectional view of the strain relief assembly of FIG. 1A in the closed position, taken along cross-section A-A in FIG. 1A.
Figure 1E:
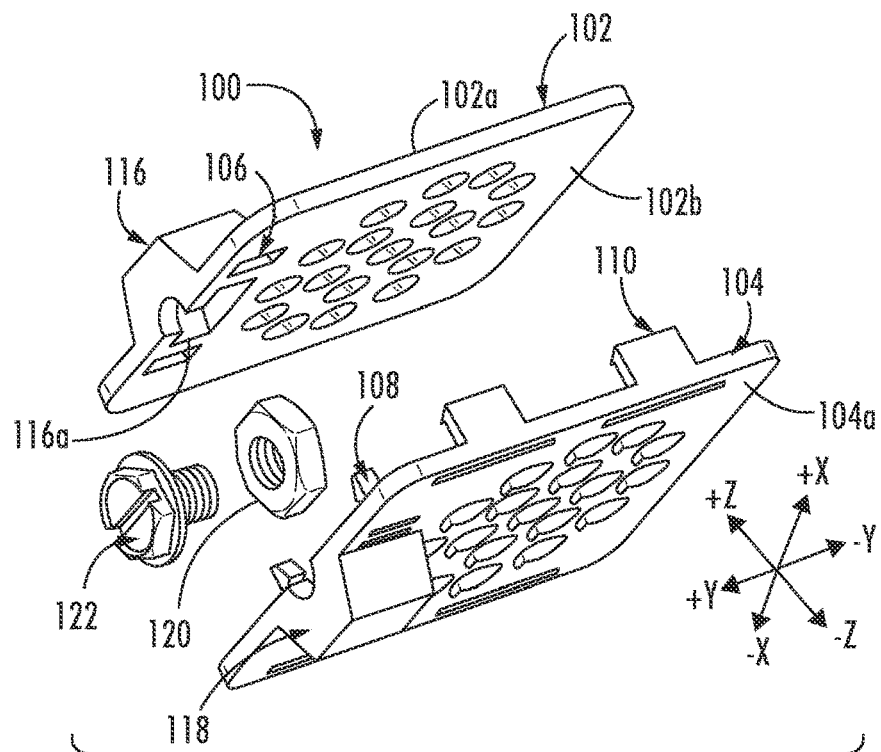
FIG. 1E schematically depicts an exploded view of the strain relief assembly of FIG. 1A, according to one or more embodiments shown and described herein.
Figure 1F:
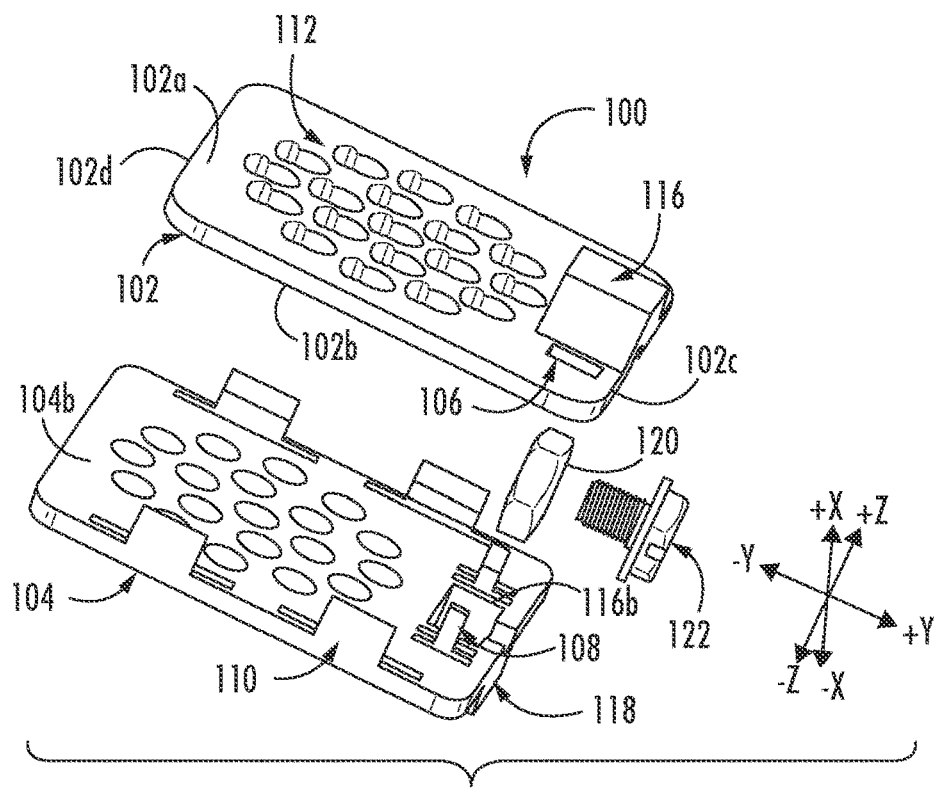
FIG. 1F schematically depicts another exploded view of the strain relief assembly of FIG. 1A, according to one or more embodiments shown and described herein.

Referring now to FIG. 1B, the bottom plate 104 is generally depicted. The bottom plate 104 may be similar to the top plate 102. For example, the bottom plate 104 may be generally symmetrical across the longitudinal axis 124. In the depicted embodiment, the bottom plate 104 includes a first bottom surface 104a and a second bottom surface 104b opposing the first bottom surface 104a, as best depicted in FIGS. 1C and 1D. Each of the first bottom surface 104a and the second bottom surface 104b are depicted as being substantially parallel to the X-Y plane, of the depicted coordinate axes. Referring again to FIG. 1B, in embodiments, the bottom plate 104 may be generally rectangular, though other shapes (e.g., hexagonal, octagonal) are contemplated and possible. The bottom plate 104 may be composed of plastic, metal, composites, or any other suitable material. In various embodiments, the bottom plate 104 may be manufactured via forming, injection molding, machining, casting, 3D printing, or the like. The bottom plate 104 may define a first bottom edge 104c, a second bottom edge 104d opposite the first bottom edge 104c, a third bottom edge 104e, and a fourth bottom edge 104f opposite the third bottom edge 104e. Accordingly, in embodiments, the bottom plate 104 may be generally rectangular, though other shapes are contemplated and possible (e.g., round, oval, or any other polygonal or non-polygonal shape).

In embodiments, the bottom plate 104 is configured to mate with the top plate 102 in a sliding arrangement. For example, and as will be described in greater detail below, the bottom plate 104 may include one or more retention features that mate with one or more features of the top plate 102 to hold the top plate 102 to the bottom plate 104. In some embodiments, the top plate 102 may be movable or slidable between an open position and a closed position, wherein the strain relief assembly 100 axially secures translation of a wire received therein. For example, in the open position, the top plate 102 is free to translate within a space defined by features the bottom plate 104. In other words, the top plate 102 may be fixed to the bottom plate 104 in the +/−Z direction of the depicted coordinate axes while being longitudinally slidable along the +/−Y direction of the depicted coordinate axes. In a closed position, the top plate 102 may be immovably coupled to the bottom plate 104 such that the top plate 102 is unable to slide relative to the bottom plate 104.

As noted above, the bottom plate 104 may include one or more retention features. The one or more retention features may include a plurality of internal mating features 108. The plurality of internal mating features 108 are configured to retain the top plate 102 to the bottom plate 104, so as to substantially limit motion of the top plate 102 relative to the bottom plate 104 in the +/−Z direction of the depicted coordinate axes. In embodiments, the internal mating features 108 are snap-fit connectors, though other mating features (e.g., bolts, hooks, etc.) are contemplated and possible. The internal mating features 108 may be positioned and sized to extend through the plurality of receiving apertures 106 and contact the first top surface 102*a* of the top plate 102 thereby holding the top plate 102 relative to the bottom plate 104 in the +/−Z direction of the depicted coordinate axes. The internal mating features 108 may have a width in the +/−Y direction that is less than a width of the plurality of receiving apertures 106 in the +/−Y direction of the depicted coordinate axes to allow the internal mating features 108 to slide along the receiving apertures 106 in the +/−Y direction of the depicted coordinate axes to move the strain relief assembly 100 between an open position and a closed position. In some embodiments, the plurality of internal mating features 108 may instead be part of the top plate 102 and the plurality of receiving apertures may be defined within the bottom plate 104.

The one or more retention features of the bottom plate 104 may further include a plurality of external mating features 110. The plurality of external mating features 110 may be arranged along one or more edges of the bottom plate 104, such as along the third bottom edge 104*e* and the fourth bottom edge 104*f*. The external mating features 110 may be configured to engage external edges (such as edges 102*e*, 102*f*) and/or the first top surface 102*a* of the top plate 102. Accordingly, the external mating features 110 may retain the top plate 102 to the bottom plate 104 in the open and closed positions so as to substantially limit motion of the top plate 102 relative to the bottom plate 104 in the +/−Z direction of the depicted coordinate axes. In embodiments, the external mating features 110 are snap-fit connectors, though other mating features (e.g., bolts, hooks, etc.) are contemplated and possible.

As noted above, the internal mating features 108 and/or the external mating features 110 may co-operate with the top plate 102 to retain the top plate 102 to the bottom plate 104 in the +/−Z direction of the depicted coordinate axes. In a closed position, that will be described in greater detail below, the top plate 102 may tend to deform away from the bottom plate 104 (e.g., bowing away from the bottom plate 104). The internal mating features 108 and/or the external mating features 110 co-operate to keep the top plate 102 aligned (e.g., substantially flush) to the bottom plate 104 at the various contact points thereby keeping the assembly together with respect to the +/−Z direction of the depicted coordinate axes. It is noted that in embodiments, the strain relief assembly 100 may include the internal mating features 108, the external mating features 110, or both.

The bottom plate 104 may further define a second portion of the adjustment assembly 121. For example, the bottom plate 104 may include a bottom protrusion 118 which provides a second portion of the adjustment assembly 121. The bottom protrusion 118 may protrude from the second bottom surface 104*b* in the −Z direction of the depicted coordinate axes, and may define a hollow bottom portion 118*a* of a cavity 119, as best depicted in FIGS. 1C and 1D, configured to receive the retaining nut 120 as will be described in greater detail herein to adjust the strain relief assembly 100, via interaction with the fastening means 122. In the depicted embodiment, the bottom protrusion 118 defines a portion of a hexagonal shape, however, other shapes (e.g., round, rectangular, octagonal) are considered and possible. Referring again to FIG. 1B, the bottom protrusion 118 may be arranged laterally between two of the plurality of internal mating features 108 in the +/−X direction of the depicted coordinate axes. For example, a first internal mating feature 108*a* may be positioned on a first side 118*c* of the bottom protrusion 118 and a second internal mating feature 108*b* may be positioned on a second side 118*b* of the first protrusion so as to be positioned opposite the first internal mating feature 108*a* across the longitudinal axis 124, though other configurations are contemplated and possible. It is noted that by placing the internal mating features 108*a*, 108*b* on either side of the adjustment assembly 121, retaining forces provided at the internal mating features 108*a*, 108*b* may better retain the position of the top plate 102 and the bottom plate 104 relative to one another (e.g., in the +/−Z direction of the depicted coordinate axes) for longitudinal adjustment (e.g., adjustment in the +/−Y direction of the depicted coordinate axes) as will be described in greater detail herein.

Referring again to FIG. 1D, when assembled, the hollow top portion 116*a* and the hollow bottom portion 118*a* combine to define the cavity 119 for receiving the retaining nut 120. Each hollow portion 116*a*, 118*a* may be structured such that movement of the first edge 102*c*, caused by tightening the retaining nut 120 via the fastening means 122, pulls the first edge 102*c* into alignment with the first bottom edge 104*c* and causes misalignment of the top ports 112 and bottom ports 114 of the bottom plate 104, thereby defining the closed position. Upon loosening of the fastening means 122, the top plate 102 may be slid relative to the bottom plate 104 to move the strain relief assembly 100 to the open position.

Referring back to FIG. 1B, the bottom plate 104 defines the plurality of bottom ports 114 (e.g., apertures, throughholes). Referring also to FIGS. 1C and 1D, the plurality of bottom ports 114 extend through a depth of the bottom plate 104 in the +/−Z direction of the depicted coordinate axes. Each bottom port 114 is sized and configured to receive a cable. In particular, the top ports 112 may be sized to receive any desired size cable depending on the particular application. In embodiments, each of the plurality of bottom ports 114 may define a perimeter which may include a bottom base portion 114*a*. In embodiments, at least a portion of the perimeter may include a bottom sloped surface 114*b* that slopes to a bottom sharpened edge 114*c* positioned opposite the bottom base portion 114*a*. For example, 10% or more of the perimeter may be sloped, 20% or more of the perimeter may be sloped, 30% or more of the perimeter may be sloped, etc. In embodiments, the bottom sloped surface may be directed towards the first bottom surface 104*a*, as depicted. In other embodiments, the bottom sloped surface may face away to a different direction relative to the first bottom surface 104*a*. In some embodiments, the sloped surface may slope relative to the Y/Z plane of the depicted coordinate axes between 10 degrees and 80 degrees, such as between about 30 degrees and about 60 degrees, such as about 45 degrees. The plurality of bottom ports 114 may be generally circular although other shapes (e.g., rectangular, pentagonal, hexagonal, octagonal) are contemplated and possible. In embodiments, the bottom sharpened edge 114*c* of the bottom sloped surface 114b may bite into a cable inserted into the bottom base portion 114a when the strain relief assembly is moved to the closed position. Accordingly, a shear force may be applied upon each cable by the plurality of bottom ports 114. This shear force secures the cable to the strain relief assembly 100. In embodiments, the strain relief assembly 100 includes either the top sloped surface 112b or the bottom sloped surface 114b. In embodiments, the strain relief assembly 100 includes neither the top sloped surface 112b nor the bottom sloped surface 114b.

As illustrated in FIGS. 1C and 2A, in the open position, the plurality of top ports 112 and the plurality of bottom ports 114 are substantially co-axial with one another (e.g., share the same center along axis 160) and collectively define a first passage area G1 when in the open position. In the open position, the first passage area G1 (shown in FIG. 1C) is sized large enough for a cable to fit through a respective top port 112 and bottom port 114 so as to be able to simultaneously slide through both the plurality of top port 112 and the bottom port 114. As illustrated in FIGS. 1D and 2B, once slid to the closed position via the adjustment assembly 121, the axes 160a of the top ports 112 and the axes 160b of the plurality of bottom ports 114 are offset from one another, such that the sharpened edges 112c, 114c move toward another decreasing the first passage area G1 (illustrated in FIG. 1C) and thus defining a second passage area G2 smaller than the first passage area G1, to clamp onto or bite into a cable.

In embodiments, the number of the plurality of top ports 112 and the plurality of bottom ports 114 may correspond to each other. For example, there may be 2 or more ports, such as 4 or more ports, such as 6 or more ports, etc. The plurality of top ports 112 and the plurality of bottom ports 114 may be arranged in a substantially circular shape, a honeycomb shape, an array, or the like.

In embodiments and as noted herein, transitioning the strain relief assembly 100 to the closed position causes the top sharpened edge 112c and the bottom sharpened edge 114c to bite into each cable. This provides a shear force which may act simultaneously on each cable inserted through corresponding top and bottom ports 112, 114. Referring to FIGS. 1C and 1D, in embodiments, the top sharpened edge 112c and the bottom sharpened edge 114c are positioned in opposition to each other such that the top sharpened edge 112c and the bottom sharpened edge 114c bite onto opposite sides of each cable. For example, each top sharpened edge 112c may be centered at 0° of one of the plurality of top ports 112 (e.g., where 0° is the closest point of each of the plurality of top ports 112 to the fastening means 122) and each bottom sharpened edge 114c may be centered at 180° of one of the plurality of bottom ports 114 (e.g., where 180° is the farthest point of each of the plurality of bottom ports 114 to the fastening means 122). In this example, when the cable is installed and the strain relief assembly 100 is transitioned to the closed position, the top sharpened edge 112c bites in to the respective cable at the 0° point along the cable (e.g., proximate to the 0° position of one of the plurality of top ports 112) at the top plate 102 and the bottom sharpened edge 114c bites at the 180° point along the cable (e.g., proximate to the 180° position of one of the plurality of bottom ports 114) at the bottom plate 104. In embodiments, the top sharpened edge 112c and the bottom sharpened edge 114c are positioned at the same position. In embodiments, the top sharpened edge 112c and the bottom sharpened edge 114c are positioned orthogonal to each other, or at other positions.

Referring to FIGS. 1C-1F collectively, the fastening means 122 may partially extend into the cavity 119. As depicted, the fastening means 122 may be a bolt or similar type fastener, having a bolt head 122a and a bolt body 122b such as a threaded shank extending from the bolt head 122a. The bolt head 122a may be positioned external to the cavity 119, and the bolt body 122b may pass into the cavity 119 via a passage provided between the first top edge 102c and the first bottom edge 104c. As noted above, the retaining nut 120 may be positioned within the cavity 119 and may define a plurality of internal threads for interacting with the bolt body 122b. For example, in embodiments, the retaining nut 120 may be sized to contact internal contours of the cavity 119, such that the retaining nut 120 is non-rotatable within the cavity 119. This allows the fastening means 122 to tighten to the retaining nut 120 (e.g., via threaded engagement) without the retaining nut 120 freely spinning. As discussed in greater detail herein, the fastening means 122 and the retaining nut 120 co-operate to transition the strain relief assembly 100 from the open position to the closed position. Although depicted as a nut and bolt configuration, the retaining nut 120 and the fastening means 122 may be any mechanism which co-operates to transition the strain relief assembly 100 from the open position to the closed position and vice versa.

As noted above, the strain relief assembly 100 is movable between the open position and the closed position via the adjustment assembly 121. In the open position, the top plate 102 is free to slide along the +/−Y direction of the depicted coordinate axes though limited by the internal mating features 108 and/or the external mating features 110. In the open position, the adjustment assembly 121 is configured such that the fastening means 122 is either not installed in the strain relief assembly 100 or is not fastened (e.g., the end of the threads of the fastening means 122 are at the initial engaging points of the retaining nut 120). Accordingly in the open position, cables may be installed into the aligned top ports 112 and bottom ports 114 of the strain relief assembly 100. After the cables are positioned, and before the cables are secured to the strain relief assembly 100, the top plate 102 may facilitate some play (e.g., free movement) between the installed cables and the plurality of top ports 112. In this way, the cables may be adjusted to avoid straining the cables before being secured in the strain relief assembly 100.

Referring collectively to FIGS. 1D and 2B, in the closed position, the top base portions 112a translates towards the fastening means 122 while the bottom base portions 114a remains stationary, thereby pulling the first top edge 102c and the first bottom edge 14c into alignment and the plurality of top ports 112 and the plurality of bottom ports 114 out of alignment. Accordingly, the size of the passage area decreases to become the second passage area G2. This is advantageous as it secures each cable installed to the strain relief assembly 100 to the strain relief assembly by applying a shear force to each cable. In embodiments, decreasing the passage area to transition to the second passage area G2 applies a sufficient enough shear force to secure each cable to the strain relief assembly 100. In this way, each cable is secured to the strain relief assembly 100 together. Accordingly, pulling or pushing forces acting on a cable, may be transferred to the strain relief assembly, which may prevent unwanted axial movement of a cable through the strain relief assembly 100.

Accordingly, in the present embodiment, a plurality of cables may be secured to the strain relief assembly 100 simultaneously. As noted above, in conventional systems, each cable must be secured to an individual strain relief device. This approach is time intensive and costly as multiple devices may be needed which may be separately set and positioned. In situations having a high-density of cables, securing each cable may be difficult or may result in some cables not being fastened by omission. The embodiments such as described above, and below, allows a plurality of cables to be secured in a timely and cost-effective process by securing the plurality of cables together in a single action.

Figure 3A:
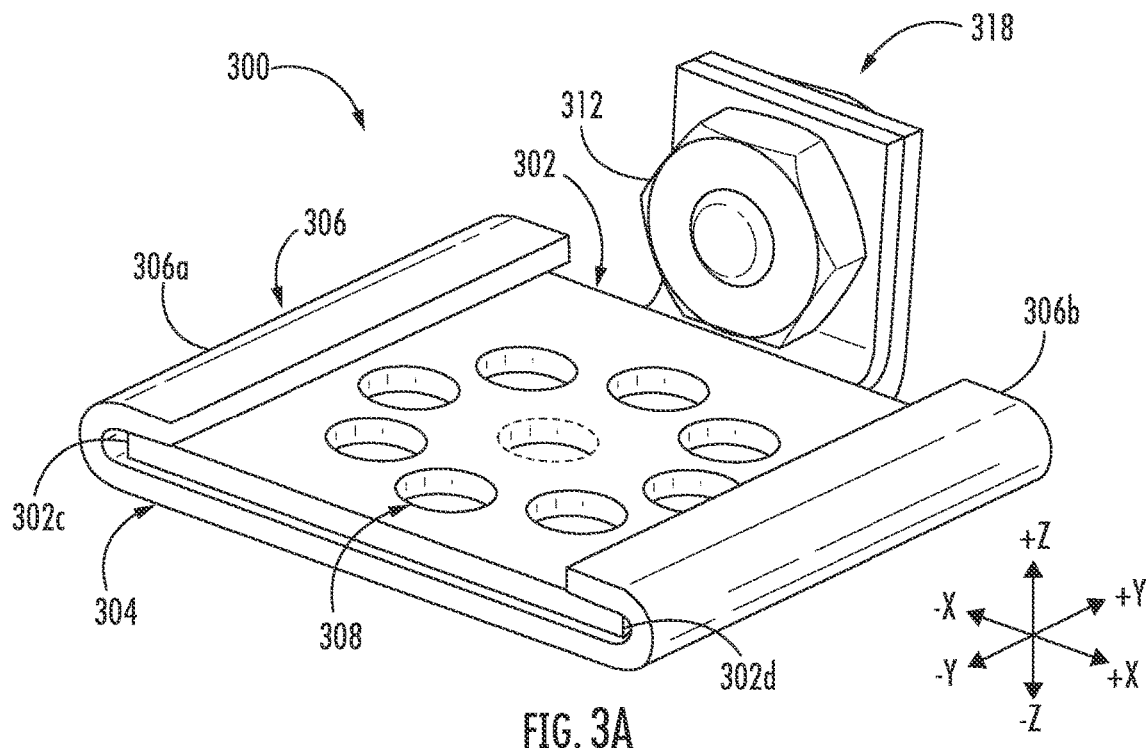
FIG. 3A generally depicts a perspective view of another embodiment of a strain relief assembly in an open position, according to one or more embodiments shown and described herein.
Figure 3B:
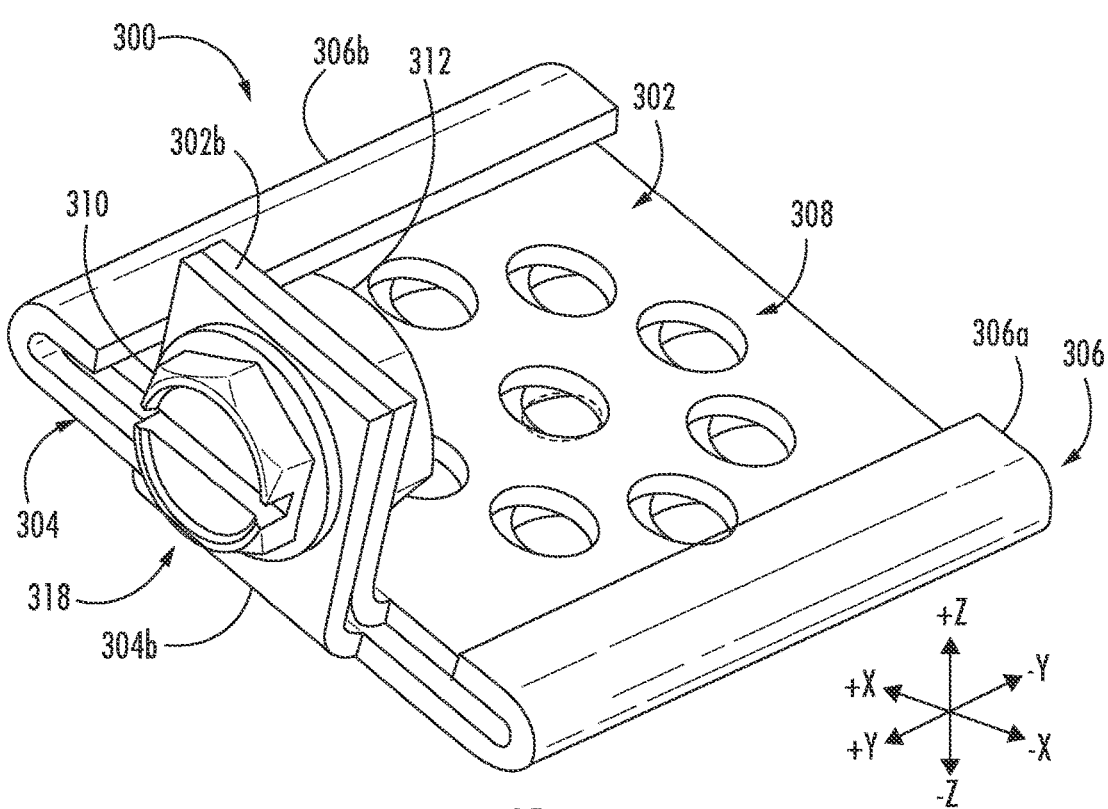
FIG. 3B generally depicts a perspective view of the strain relief assembly of FIG. 3A in a closed position, according to one or more embodiments shown and described herein.

Referring now to FIGS. 3A-3B, an embodiment of a strain relief assembly 300 is generally depicted. The strain relief assembly 300 includes a top plate 302, a bottom plate 304, a retaining device 306, a fastening means 310, a retaining nut 312, and an adjustment assembly 318. In particular, the strain relief assembly 300 may include substantially similar features as described above with respect to the strain relief assembly 100. Accordingly, the above description is applicable to the present embodiment unless otherwise noted or apparent.

Similar to FIGS. 1A-1F, the top plate 302 and the bottom plate 304 co-operate to secure a plurality of cables to the strain relief assembly 300. However, in the present embodiment, the bottom plate 304 includes a first overlap edge 306a and a second overlap edge 306b. The first overlap edge 306a and the second overlap edge 306 collectively define the retaining device 306. Each of the first overlap edge 306a and the second overlap edge 306 overlap edges 302c, 302d of the top plate 302, thereby restraining movement of the top plate 302 relative to the bottom plate 304 in the +/−Z direction of the depicted coordinate axes. In embodiments, the first overlap edge 306a and the second overlap edge 306b extend along and overlap a whole of the edges 302c, 302d of the top plate 302. However, in some embodiments, the first overlap edge 306a and the second overlap edge 306b may only overlap a portion of edges 302c, 302d along the +/−Y direction of the depicted coordinated axes. In embodiments, the first and second overlap edges 306a, 306b may be extruded from the bottom plate 304 so as to be integral therewith, however, in other embodiments, the first and second overlap edges 306a, 306b may be coupled to the bottom plate 304 through any conventional coupling techniques (e.g., welding, brazing, adhesives, fasteners, etc.). Accordingly, the present embodiment may provide an improved manufacturability with reduced complexity.

In the present embodiment, the adjustment assembly 318 may include a top fastening plate 302b extending from the top plate 302 and a bottom fastening plate 304b extending from the bottom plate 304. The top fastening plate 302b and the bottom fastening plate 304b may be configured to be arranged overlapping one another and may operate in a substantially similar matter as described with respect to the adjustment assembly 121 above. In particular, drawing of the top fastening plate 302b and the bottom fastening plate 304b towards one another in the +Y direction of the depicted coordinate axes (e.g., via tightening of the fastening means to the retaining nut 312), moves top ports 308 defined in the top plate 302 out of axial alignment with bottom ports defined in the bottom plate 304 to transition the strain relief assembly 300 from the open position to the closed position.

Each of the top fastening plate 302b and the bottom fastening plate 304b may extend in the +Z direction of the depicted coordinate axes from their respective top plate 302 and bottom plate 304, though other directions are contemplated and possible. The top fastening plate 302b and the bottom fastening plate 304b may be a square shaped as depicted, though other shapes (e.g., round, rectangular, octagonal) are considered and possible.

Figure 4A:
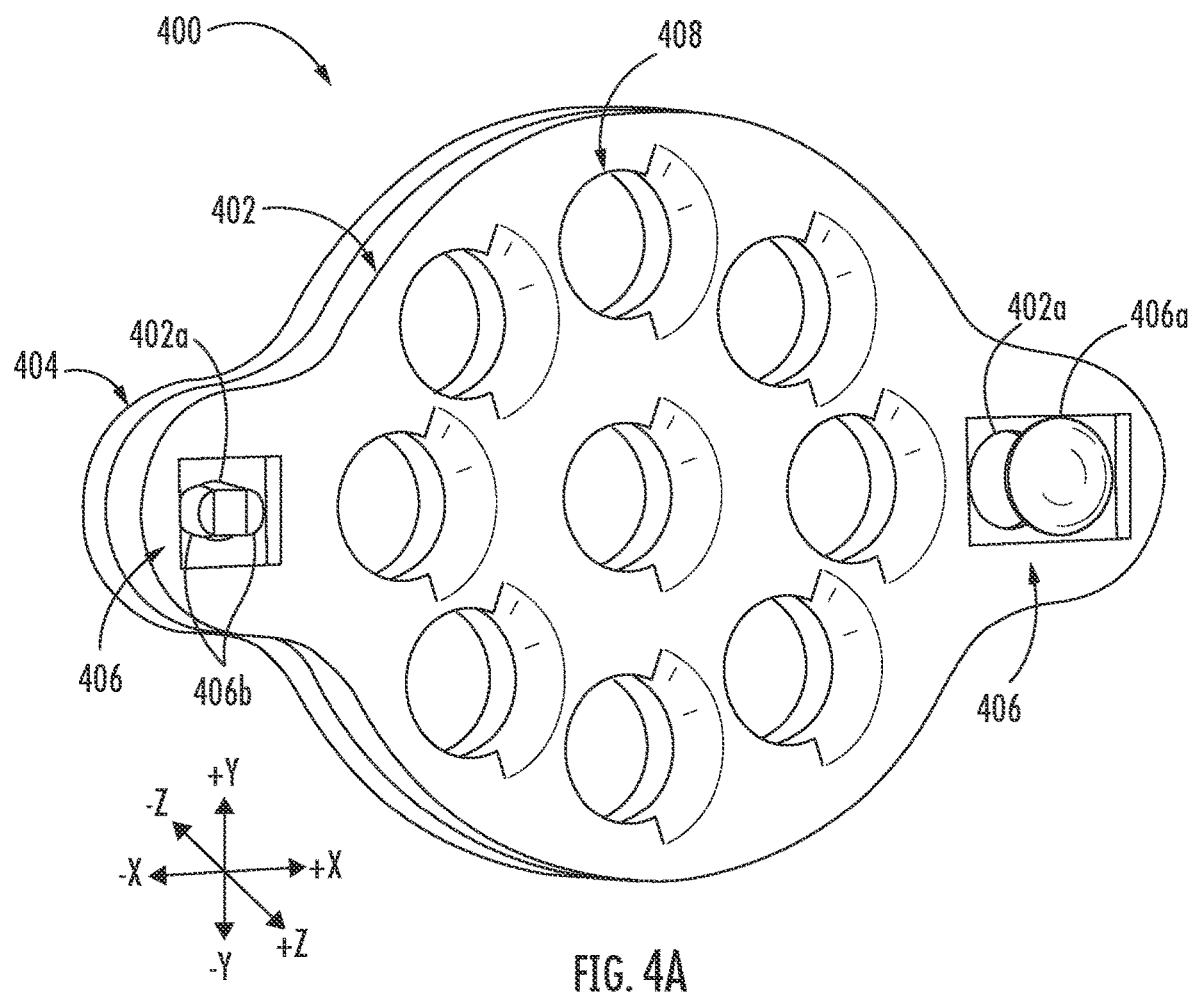
FIG. 4A generally depicts a perspective view of yet another embodiment of a strain relief assembly in an open position, according to one or more embodiments shown and described herein.
Figure 4B:
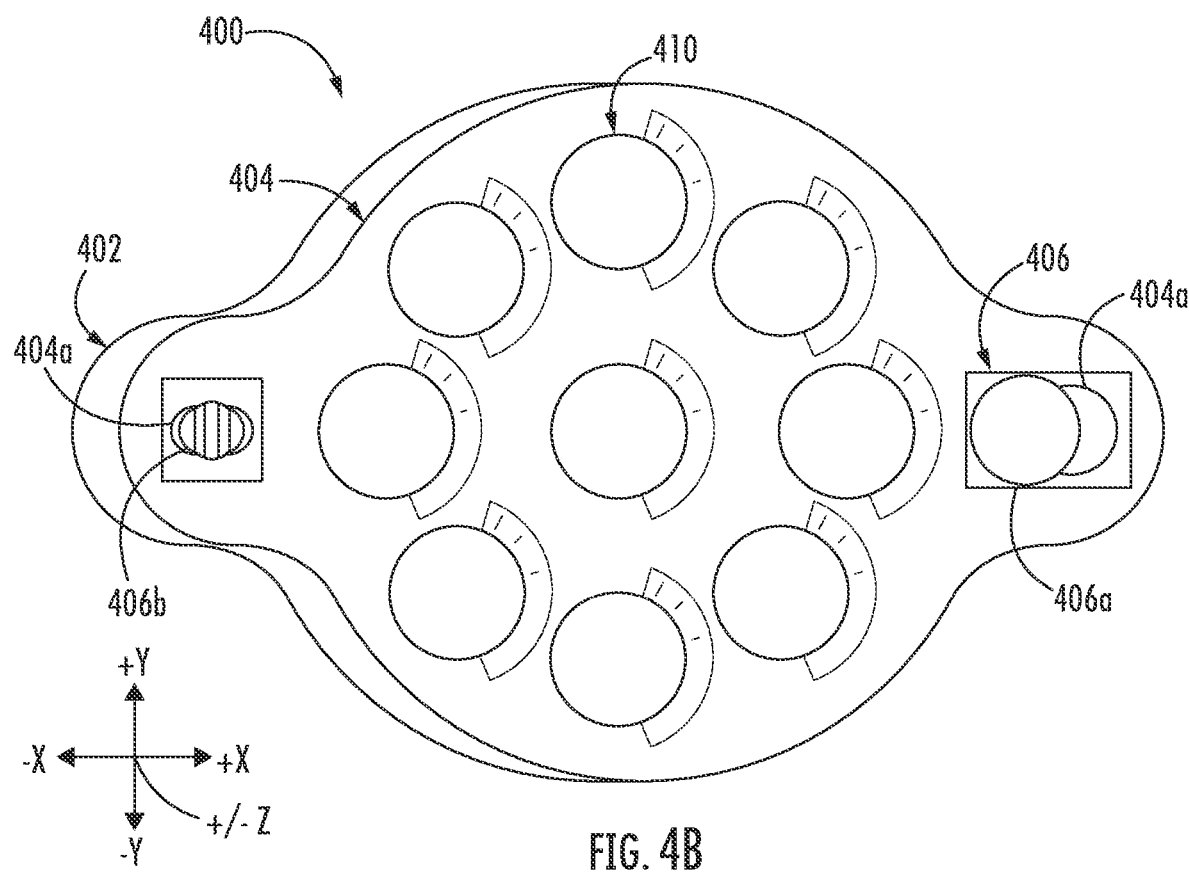
FIG. 4B generally depicts a top view of the strain relief assembly of FIG. 4A in the open position, according to one or more embodiments shown and described herein.
Figure 4C:
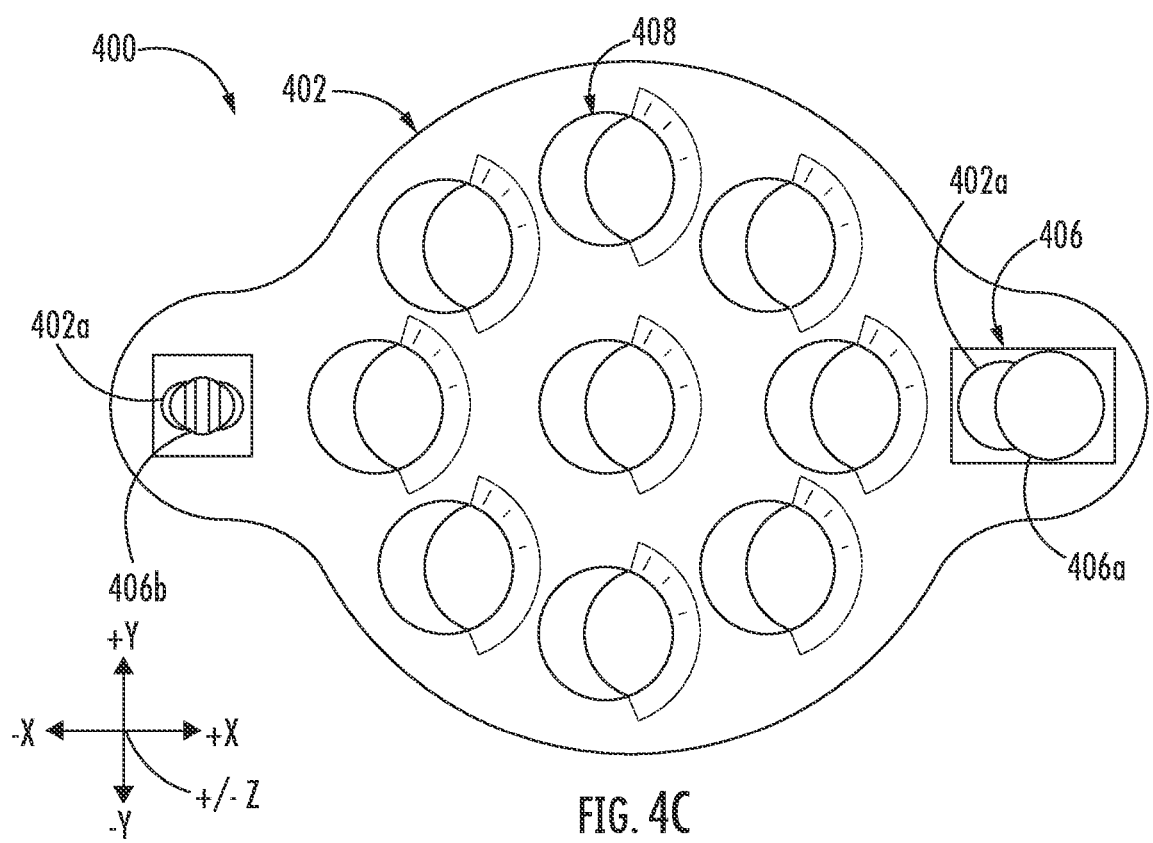
FIG. 4C generally depicts a top view of the strain relief assembly of FIG. 4A in a closed position, according to one or more embodiments shown and described herein.

Referring now to FIGS. 4A-4C, a strain relief assembly 400 is shown according to another embodiment. The strain relief assembly 400 includes a top plate 402, a bottom plate 404, and a plurality of push-rods 406 (e.g., push-pins). In particular, the strain relief assembly 400 may include substantially similar features as described above with respect to the strain relief assembly 100. Accordingly, the above description is applicable to the present embodiment unless otherwise noted or apparent.

Similar to FIGS. 1A-1F, the top plate 402 and the bottom plate 404 co-operate to secure a plurality of cables to the strain relief assembly 400. In these embodiments, the top plate 402 and the bottom plate 404 may be substantially identical. This is advantageous as it reduces the number of varying components required in the assembly, thereby reducing manufacturing and assembly costs.

Still referring to FIGS. 4A and 4B, the top plate 402 may include a plurality of top receiving apertures 402a. The plurality of top receiving apertures 402a may be generally may have any elongated shape to allow for movement of a pushrod along the +/−X direction of the depicted coordinate axes. The plurality of receiving apertures 402a extend through a depth of the top plate 402 in the +/−Z direction of the depicted coordinate axes (e.g., the plurality of receiving apertures 402a are through-holes). The bottom plate 404 may also include a plurality of bottom receiving apertures 404a (shown in FIG. 4b). The top receiving apertures 402a and the bottom receiving apertures 404a may be aligned so that they may co-operate to receive a push-rod 406 in both the top plate 402 and the bottom plate 404. In the depicted embodiment, each of the top plate 402 and the bottom plate 404 include two receiving apertures, though a greater or fewer number of apertures are contemplated and possible.

The top plate 302 may further include a plurality of top ports 408, which may include substantially similar features as described above with respect to the plurality of top ports 112. The bottom plate 404 defines a plurality of bottom ports 410 (e.g., shown in FIG. 4B), which may include substantially similar features as described above with respect to the plurality of bottom ports 114.

In embodiments, there may be a plurality of push rods 406. The plurality of push rods 406 may be positioned along a surface of top plate 402 and a surface of the bottom plate 404. The push-rods 406 are positioned through a plurality of receiving apertures 402a, 404a for both the top plate 402 and the bottom plate 404. Each of the push-rods 406 include a head 406a engaged with one of the first plate 402 and the second plate 404 and one or more retention feet 406b engaged within the other of the first plate 402 and the second plate 404. For example, when the pushing side of the push-rod 406 is positioned on the top plate 402, the retention feet 406b extends through the bottom plate 404. The push-rods 406 co-operate to retain the top plate 402 to the bottom plate 404. The push-rods 406 may co-operate to allow transition the strain relief assembly 400 from the open position depicted in FIG. 4B to the closed position depicted in FIG. 4C. For example, the push rods 406 while retraining motion in the +/−Z direction of the depicted coordinate axes, may allow the top plate 402 to slide relative to the bottom plate 404 to the closed position from the open position, thereby moving the plurality of top ports 408 out of alignment with the plurality of bottom ports. In other words, translating the push-rods 406 in the X-direction, of the depicted axes, on both the top plate 402 and the bottom plate 404 results in the strain relief assembly 400 securing the plurality of cables positioned within the plurality of top ports 408 and the plurality of bottom ports. The present embodiment is advantageous as it reduces the number of varying components between the top plate 402 and the bottom plate 404, thereby reducing manufacturing and assembly costs. The push-rods 406 or the top plate 402 and/or bottom plate 404 may be translated manually (e.g., by manually) or through a mechanical device (e.g., lever, actuator).

Figure 5A:
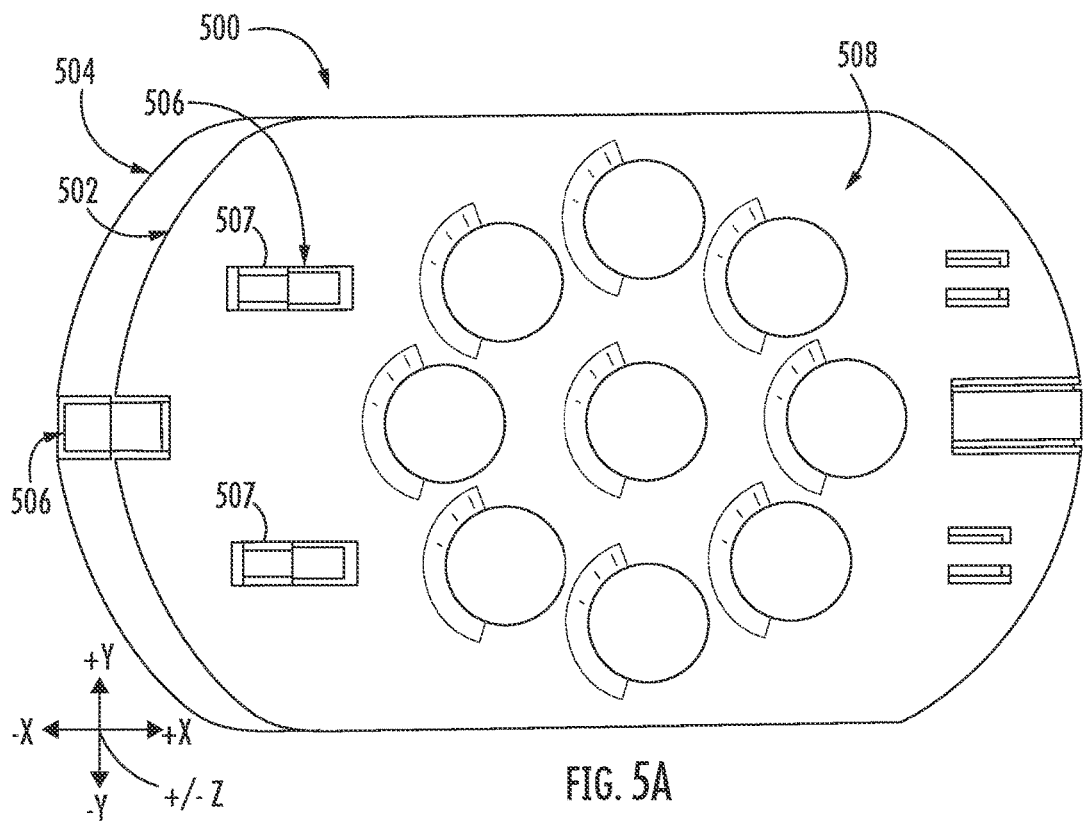
FIG. 5A generally depicts a top view of yet another embodiment of a strain relief assembly in an open position, according to one or more embodiments shown and described herein.
Figure 5B:
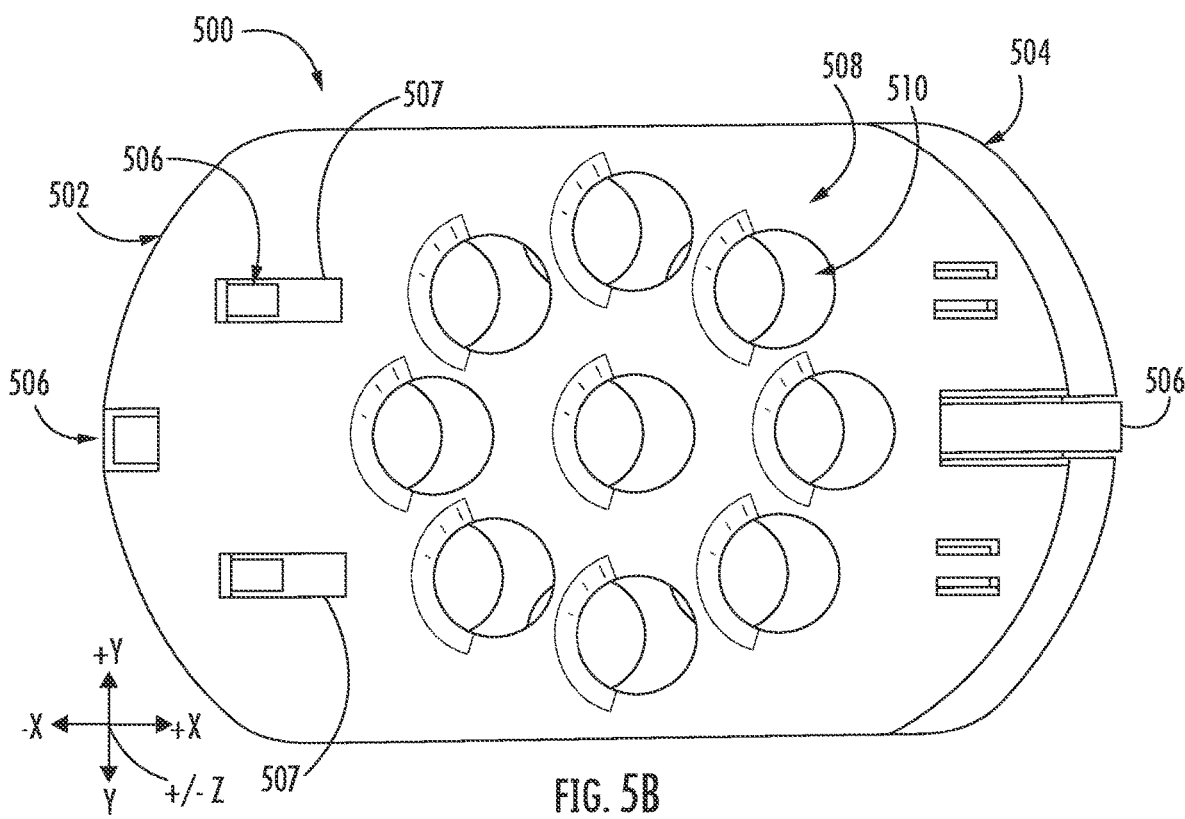
FIG. 5B generally depicts the strain relief assembly of FIG. 5A in a closed position, according to one or more embodiments shown and described herein.

Referring now to FIGS. 5A-5B, a strain relief assembly 500 is shown according to another embodiment. The strain relief assembly 500 includes a top plate 502, a bottom plate 504, and hooks 506. In particular, the strain relief assembly 500 may include substantially similar features as described above with respect to the strain relief assembly 100. Accordingly, the above description is applicable to the present embodiment unless otherwise noted or apparent.

Similar to FIGS. 1A-1E, the top plate 502 and the bottom plate 504 co-operate to secure a plurality of cables to the strain relief assembly 500. In these embodiments, the top plate 502 and the bottom plate 504 are identical. This is advantageous as it reduces the number of varying components required in the assembly, thereby reducing manufacturing and assembly costs. The top plate 502 may include a plurality of top ports 508, which may include substantially similar features as described above with respect to the plurality of top ports 112. The bottom plate 504 defines a plurality of bottom ports 510, which may include substantially similar features as described above with respect to the plurality of bottom ports 114. When the strain relief assembly 500 transitions from the open position to the closed position, the plurality of top ports 508 and the plurality of bottom ports 510 become misaligned, reducing an area of for a cable to pass through, and securing the plurality of cables to the strain relief assembly 500.

The hooks 506 are positioned on both the top plate 502 and the bottom plate 504. The hooks 506 co-operate to retain the top plate 502 to the bottom plate 504 by extending through an aperture 507 of the opposite plate and/or engaging an edge surface of the opposite plate. Further, the hooks 506 co-operate to transition the strain relief assembly 500 from the open position (FIG. 5A) to the closed position (FIG. 5B). In other words, translating the hooks 506 along the X-direction results in the strain relief assembly 500 securing the plurality of cables within the plurality of top ports 508 and the plurality of bottom ports 510. This is advantageous as it reduces the number of varying components required in the assembly, thereby reducing manufacturing and assembly costs. For example, an integrated adjustment assembly may not be required as the hooks 506 are integrated into the top plate 502 and the bottom plate 504. The hooks 506 may be translated manually (e.g., by manually hooking each hook 506 around an edge of the opposite plate) or via an adjustment lever or other mechanism. Such embodiment may be advantageous as it may include fewer components, thereby simplifying manufacturing processes.

Figure 7:
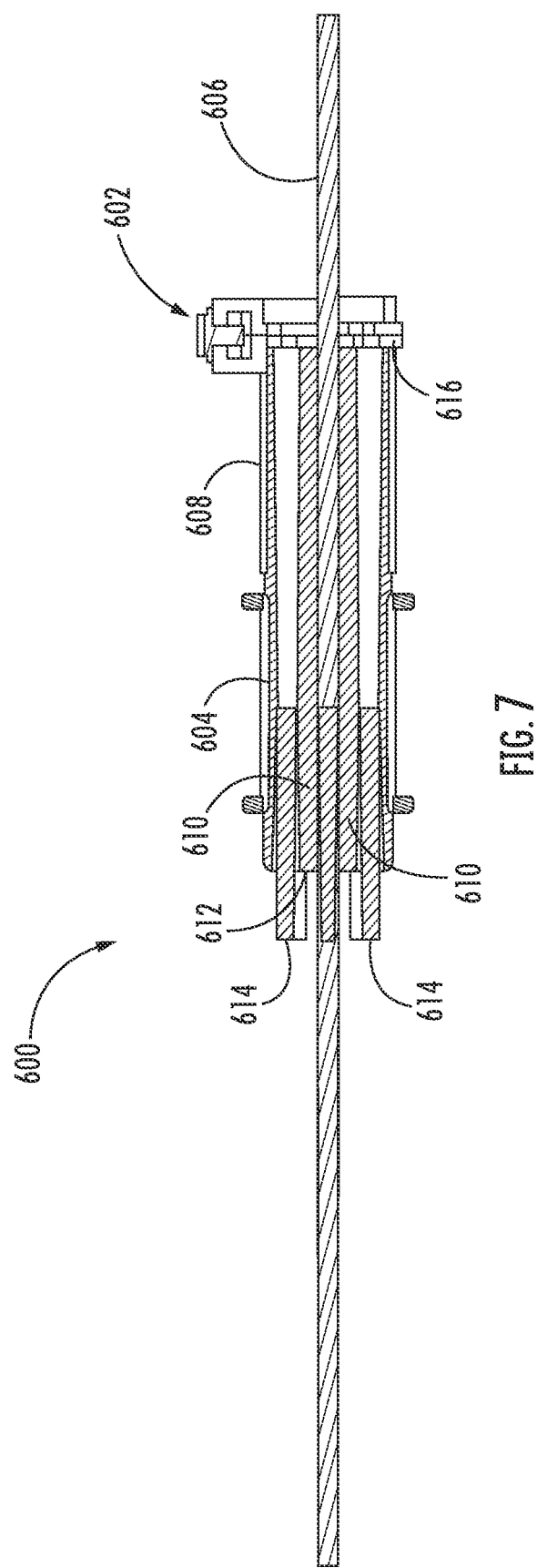
FIG. 7 generally depicts a side view of the strain relief assembly of FIG. 6, taken along cross-section A-A, according to one or more embodiments shown and described herein.

Referring now to FIGS. 6-7, a strain relief assembly 602 (e.g., such as strain relief assembly 100, 300, 400, 500) is illustrated as assembled into a cable enclosure system 600, is shown according to embodiments. The cable enclosure system 600, such as a cable connector enclosure (e.g., a splice closure), may provide protection to cable connections from external forces and environmental factors. The cable enclosure system 600 may include an inlet 601 for receiving one or more cables, such as a plurality of cables. In embodiments, the inlet 601 may be a cavity providing ingress/egress into the cable enclosure system 600.

FIG. 7 illustrates a cross-section along the inlet 601 and strain relief assembly 602. Extending through the inlet 601 may be a grommet 604. The grommet 604 may be a flexible or stiff tube configured to provide a water seal for the one or more cables extending into the cable enclosure system 600. For example, the grommet 604 may be coupled to a wall of the inlet 601 via fastening, friction fit, adhesion, or the like.

Positioned within the grommet 604 and the inlet 601 may be a support assembly 610 defining a plurality of openings for one or more cables to extend through. For example, a cable 606 extends through the assembly and the grommet 604, to the strain relief assembly 602, and is secured to the strain relief assembly 602. It is noted that a greater number of cables may extend through the grommet 604 and the support assembly 610, but only one is depicted for simplicity. A plurality of openings 612 of the support assembly 610 without a cable positioned therein may be closed via a blocking member 614, which may be later removed if needed. The blocking member 614 may seal the unused opening thereby preventing fluid and/or debris ingress into the cable enclosure system 600.

In the present embodiment, the strain relief assembly 600 may include a collar 608, which may be coupled to a bottom plate 616 of the strain relief assembly. For example the collar 608 may be sized to receive the grommet 604 such that the grommet extends up to and abuts the bottom plate 616. In other embodiments, the collar 608 may not be coupled to the strain relief assembly 600 may be abutted against the strain relief assembly 600. In embodiments, the grommet 604 may be coupled to the collar 608 via fastening, friction fit, adhesion, or the like. Accordingly, the collar 608 may hold the strain relief assembly 602 to the grommet 604.

During assembly, the strain relief assembly 602 is positioned in an open position such that a top port and a bottom port, as described above, are substantially axially aligned with one another. Accordingly, the cable 606 may be routed through the aligned top and bottom port. Once routed through, along with any other cables, the strain relief assembly 602 may be moved to the closed position as described herein. That is, the top port and the bottom port may be moved out of axial alignment to impinge the cable 606 (such as a jacket of the cable) within a reduced passage area thereby creating a shear force acting on the cable 606. This shear force allows tensile force (e.g., from pulling) acting upon the cable 606 to be absorbed by the strain relief assembly 602. For example, axial forces acting on the cable 606 may transferred or carried through the strain relief assembly 602 to the cable enclosure system 600 via interaction between the grommet 604 and the strain relief assembly 602. Accordingly, the cable 606 may withstand a greater amount of axial loading without coming undone from the strain relief assembly.

Figure 8:
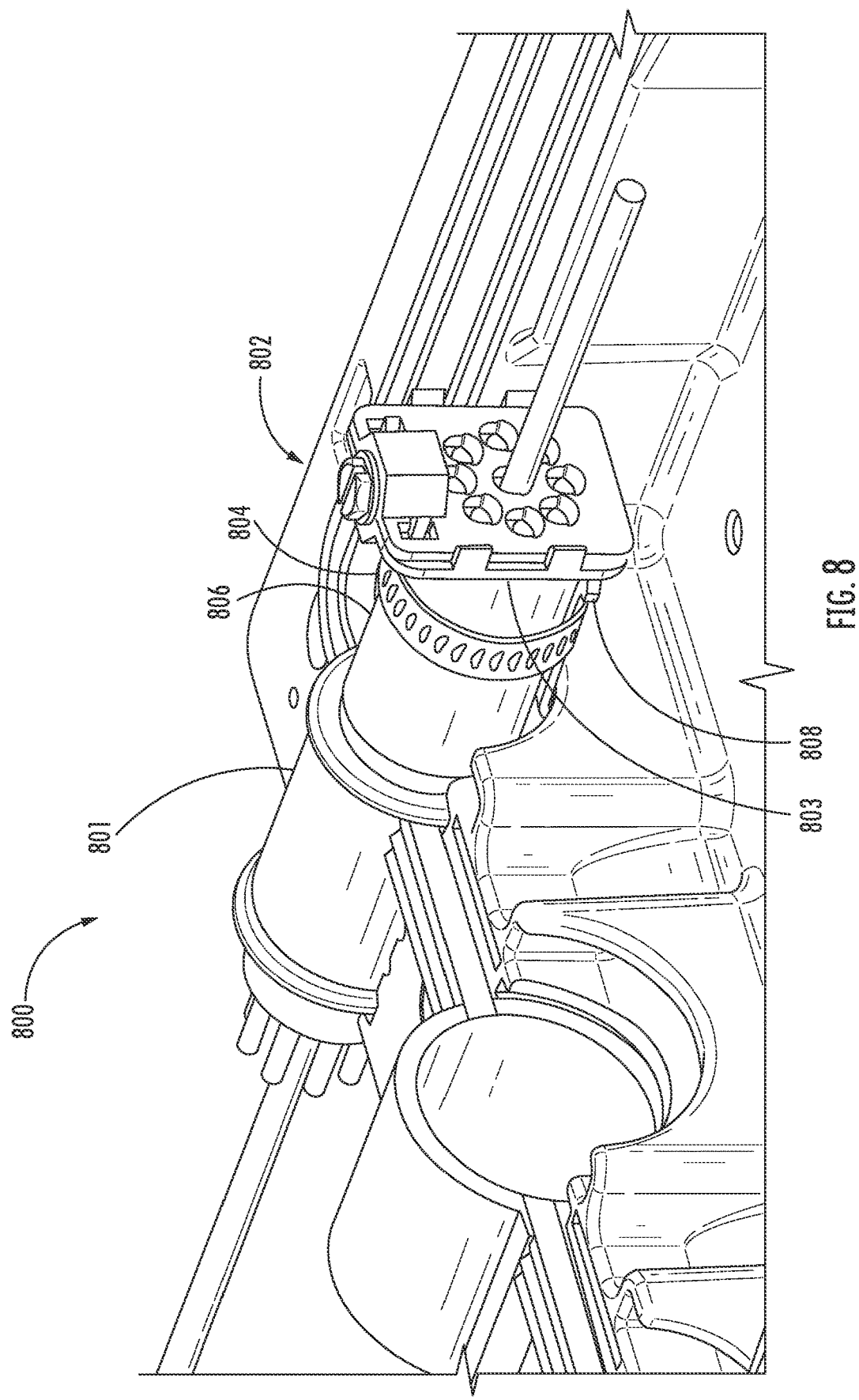
FIG. 8 generally depicts a perspective view of a strain relief assembly assembled within an enclosure, according to one or more embodiments shown and described herein.

Referring now to FIG. 8, a strain relief assembly 802 (e.g., such as strain relief assembly 100, 300, 400, 500) assembled into a cable enclosure system 800, is shown according to another embodiment. The cable enclosure system 800 is similar to cable enclosure system 600, but includes a hose clamp 804 coupling the grommet 806 to a strain relief bracket 808 that is extends from the bottom plate 803 of the strain relief assembly 802.

For example, the strain relief bracket 808 may be placed in contact with the grommet 806. The hose clamp 804 extends around the grommet 806 and the strain relief bracket 808. When the hose clamp 804 is fastened, it couples the collar 608 to the strain relief bracket 808. If a large enough tensile force is applied upon a cable, it may cause the strain relief assembly 802 to be pulled towards the inlet 801. In this embodiment, the strain relief assembly 802 may contact the strain relief bracket 808, thereby preventing the strain relief assembly 802 from translating too far in the direction of the pulling force by creating a barrier.

It should now be understood that embodiments as described herein are directed to strain relief assemblies and cable enclosures. A strain relief assembly may generally include a top plate and a bottom plate. The top plate includes a plurality of top ports configured to receive a plurality of cables at a first point. The bottom plate includes a plurality of bottom ports configured to receive the plurality of cables at a second point. The strain relief assembly is movable between an open position and a closed position. In the open position, the plurality of top ports and the plurality of bottom ports define a first area. In the closed position, the plurality of top ports and the plurality of bottom ports define a second area smaller than the first area. Accordingly, in the closed position, the strain relief assembly may clamp onto a cable received therein. Axial strain acting on the cable may be absorbed by the strain relief assembly, thereby providing improved performance. Strain relief assemblies according to the present disclosure provide improved assembly, convenience, resilience and cost-effectiveness.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A strain relief assembly comprising:
   a top plate and a bottom plate, wherein
   the top plate defines a plurality of top ports configured to receive a plurality of cables at a first point,
   at least a portion of a perimeter of the plurality of top ports is sloped,
   the bottom plate defines a plurality of bottom ports configured to receive the plurality of cables at a second point,
   the strain relief assembly is movable between an open position and a closed position,
   in the open position, the plurality of top ports and the plurality of bottom ports collectively define a first passage area, and
   in the closed position, the plurality of top ports and the plurality of bottom ports collectively define a second passage area smaller than the first passage area.

2. The strain relief assembly of claim 1, wherein the bottom plate comprises a plurality of retaining devices which engage an first top surface of the top plate from second top surface of the top plate engaged with the bottom plate, and
the plurality of retaining devices are configured to retain the top plate to the bottom plate in the open position.

3. The strain relief assembly of claim 2, wherein the retaining device is extruded material.

4. The strain relief assembly according to claim 1, wherein the plurality of top ports are coaxial to the plurality of bottom ports in the open position.

5. The strain relief assembly according to claim 1, wherein the portion of the perimeter of plurality of top ports that is sloped slopes to a sharp edge configured to engage a respective cable of the plurality of cables.

6. The strain relief assembly according to claim 1, wherein each of the plurality of bottom ports includes a sharp edge configured to engage a respective cable of the plurality of cables.

7. The strain relief assembly according to claim 1, further comprising a fastener configured to move the strain relief assembly from the open position to the closed position in response to the fastener being fastened.

8. The strain relief assembly of claim 7, wherein:
   a center line of the fastener defines a longitudinal axis; and
   the strain relief assembly moves from the open position to the closed position in response to the top plate translating along the longitudinal axis.

9. The strain relief assembly according to claim 1, wherein each of the plurality of top ports are configured to apply a shear force on the plurality of cables at the first point in the closed position.

10. The strain relief assembly according to claim 1, wherein each of the plurality of bottom ports are configured to apply a shear force on the plurality of cables at the second point in the closed position.

11. A strain relief assembly for a plurality of cables comprising:
    a bottom plate comprising an overlap edge and defining a plurality of bottom ports; and
    a top plate defining a plurality of top ports, wherein at least a portion of a perimeter of the plurality of top ports is sloped, the top plate being movable between an open position and a closed position, in the open position the top plate is retained to the bottom plate via the overlap edge, and in the closed position the top plate is immovably coupled to the bottom plate.

12. The strain relief assembly according to claim 11, wherein the overlap edge extruded material.

13. The strain relief assembly according to claim 11, wherein the plurality of top ports are coaxial to the plurality of bottom ports in the open position.

14. The strain relief assembly according to claim 11, wherein each of the plurality of top ports include a sharp edge configured to engage a respective cable of the plurality of cables.

15. The strain relief assembly according to claim 11, wherein each of the plurality of bottom ports include a sharp edge configured to engage a respective cable of the plurality of cables.

16. The strain relief assembly according to claim 11, wherein each of the plurality of top ports are configured to apply a shear force on the plurality of cables in the closed position.

17. The strain relief assembly as in one of claims 11-16, in which each of the plurality of bottom ports are configured to apply a shear force on a respective cable the plurality of cables in the closed position.

18. The strain relief assembly of claim 1, further comprising a collar coupled to the bottom plate, wherein the collar is couplable to a cable enclosure.

* * * * *